United States Patent

Hibst et al.

Patent Number: 4,664,831
Date of Patent: May 12, 1987

[54] PREPARATION OF FINELY DIVIDED FERRITE POWDERS

[75] Inventors: Hartmut Hibst, Ludwigshafen; Udo Kullmann, Dirmstein, both of Fed. Rep. of Germany

[73] Assignee: BASF Aktiengesellschaft, Fed. Rep. of Germany

[21] Appl. No.: 408,599

[22] Filed: Aug. 16, 1982

[30] Foreign Application Priority Data

Aug. 19, 1981 [DE] Fed. Rep. of Germany ....... 3132677
Aug. 19, 1981 [DE] Fed. Rep. of Germany ....... 3132680
Aug. 19, 1981 [DE] Fed. Rep. of Germany ....... 3132684

[51] Int. Cl.$^4$ ............................................. C04B 35/26
[52] U.S. Cl. ............................. 252/62.59; 252/62.56; 252/62.6; 252/62.61; 252/62.62; 252/62.63; 252/62.64; 423/594; 423/632
[58] Field of Search ................................ 423/594, 632; 252/62.56, 62.59, 62.6, 62.61, 62.62, 62.63, 62.64

[56] References Cited

U.S. PATENT DOCUMENTS

| | | | |
|---|---|---|---|
| 3,102,099 | 8/1963 | Stuijts | 252/62.63 X |
| 3,150,925 | 9/1964 | Gambino | 423/594 X |
| 3,509,057 | 4/1970 | Greger | 423/594 X |
| 3,582,266 | 6/1971 | Sopp et al. | 423/632 |
| 3,634,254 | 1/1972 | Micheli | 252/62.63 |
| 3,793,443 | 2/1974 | Arendt | 423/594 |
| 3,810,973 | 5/1974 | Arendt et al. | 423/594 |
| 4,120,807 | 10/1978 | Watanabe et al. | 252/62.62 |

FOREIGN PATENT DOCUMENTS 1254390 11/1971 United Kingdom.

OTHER PUBLICATIONS

A. Tauber et al., J. Appl. Phys. 35, (part 2) (1964), p. 1008.

K. Haneda, "Journal of the American Ceramic Society" vol. 57, No. 8, (1974), pp. 354–357.
A. Tauber et al., J. Appl. Phys., Suppl. 33 (1962), p. 1381 S.

Primary Examiner—Jack Cooper
Attorney, Agent, or Firm—Keil & Weinkauf

[57] ABSTRACT

A process for the preparation of finely divided ferrites of the general formula $$MeFe_2O_4 \qquad (I)$$

where $Me = aMn + bNi + cZn + dCo + eFe(II)$, and the atomic weight ratios a, b, c, d and e are each from 0 to 1 and their sum is 1, or $$M_2^1 Me_2^1 Fe_{12}O_{22} \qquad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_x Fe_{12-2x}O_{19} \qquad (III)$$

where $M^2$ is barium or strontium, $Me^2$ is zinc, nickel and/or cobalt and x is from 0 to 1.5, wherein the aqueous solutions of the salts required for the particular composition are reacted with an aqueous solution of sodium carbonate and/or potassium carbonate, the water is removed, the dry salt mixture is heated at from 800° to 1200° C., and the resulting finely divided ferrite of the predetermined composition is isolated by leaching with water.

4 Claims, No Drawings

PREPARATION OF FINELY DIVIDED FERRITE POWDERS

The present invention relates to a process for the preparation of finely divided ferrites of the general formula $$MeFe_2O_4 \tag{I}$$

where Me=aMn+bNi+cZn+dCo+eFe(II), and the atomic weight ratios a, b, c, d and e are each from 0 to 1 and their sum is 1, or $$M^1_2Me^1_2Fe_{12}O_{22} \tag{II}$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \tag{III}$$

where $M^2$ is barium or strontium, $Me^2$ is zinc, nickel and/or cobalt and x is from 0 to 1.5.

Magnetically soft manganese zinc ferrite and nickel zinc ferrite powders of the type shown in formula (I) which are used for producing magnetic head ceramics, and shielding materials are conventionally prepared by a ceramic process. For this purpose, manganese oxide or nickel oxide is mixed with zinc oxide and iron(III) oxide in the ratio which corresponds to the chemical formula of the ferrite to be produced, and the mixture is heated at from 1100° to 1200° C., the magnetically soft spinel ferrite being formed. The sintered crystallite conglomerates formed are then milled, generally in the presence of water, to give a powder of particle size about 1 μm. The milling creates crystal defects in the particles, resulting in poorer magnetic properties. Furthermore, the milled ferrite powders exhibit a broad particle size spectrum. Accordingly, the magnetically soft ferrite ceramic produced by processing these powders further also exhibits, inter alia, a broad particle size spectrum.

In addition to a ceramic process, co-precipitation processes have also been employed for preparing MnZn ferrites and NiZn ferrites. These processes have the disadvantage that the co-precipitate produced in a liquid phase is too finely divided, and accordingly very difficult to separate from the liquid phase. Since, furthermore, finely divided precipitated products may run through the filter, it is difficult to obtain these with a composition corresponding to the specified molar ratio of the particular components. A further disadvantage is that the ferrites obtained are difficult to disperse, because they have sintered during heating, and must be milled before being used further.

Furthermore, it has been disclosed that ferrites of the spinel type having the composition $MeFe_2O_4$ may be prepared from aqueous solution by oxidizing Me-Fe(II) hydroxide co-precipitates. However, the ferrites prepared in this manner are very finely divided, and, when they are compressed, the resulting moldings have comparatively low, inadequate densities.

For the production of magnetic ceramics and magnetically soft plastoferrites, it is desirable to have isotropic ferrite powders of the spinel type which possess a narrow particle size distribution, high compressability, and good dispersibility for incorporation into organic binders.

The hexagonal $Me_2Y$ ferrite phase of the composition $M^1_2Me^1Fe_{12}O_{22}$ (formula II), where $M^1$ is Ba, Sr, Ca, and/or Pb and $Me^1$ is Mn(II), Cu(II), Fe(II), Co(II), Ni(II), Zn, Mg and/or (Li+Fe(III))/2, which is used for producing magnetic ceramics for high frequency technology is also conventionally prepared by a ceramic process. For this purpose, $M^1CO_3$, $Me^1CO_3$ or $Me^1O$ and iron oxide are mixed in the ratio which corresponds to the chemical formula of the ferrite to be produced, and the mixture is heated, ie. pre-sintered, at from 1100° to 1300° C. The resulting highly sintered conglomerates of flaky crystallites are then milled, generally in the presence of water, to give a powder of particle size about 1 μm. However, the milling destroys the greater part of the flakes formed, and only a powder having a broad particle size distribution is obtained.

In addition, co-precipitation processes have also been employed for preparing the $Me^1_2Y$ ferrite. Thus, Japanese Preliminary Published Application Nos. 50 106899 and 50 039700 describe processes in which the dissolved metal cations are precipitated as sparingly soluble organometallic compounds by means of organic complex formers in ammoniacal solution, and these compounds are filtered off and washed. The dry precipitate is then heated at from 1100° to 1300° C. In J. Korean. Ceram. Soc. 16 (2) (1979), 89–98, T.-O. Kim et al. describe a process in which an aqueous solution containing $BaCl_2$, $Zn(NO_3)_2$ and $FeCl_3$ is treated with an $NaOH/Na_2CO_3$ solution, and the precipitate obtained is washed, freeze-dried and then heated. Although the resulting powders contain the desired $Zn_2Y$ ferrite as the main component, they comprise more than one phase. Moreover, the freeze-drying process is very expensive and uneconomical. The above co-precipitation processes have the further disadvantage that the co-precipitate produced in a liquid phase is finely divided and accordingly difficult to separate from the liquid phase. Since, on filtering and subsequent washing, finely divided precipitated products may run through the filter, it is difficult to obtain these with a composition corresponding to the specified molar ratios of the particular components. Because of these shortcomings, these processes have hitherto not been operated industrially. They have the further disadvantage that the resulting ferrites, because they have sintered during heating, must be milled before being used further.

Co-precipitations in general bring about intimate contact between the reactants and thus accelerate the reaction. However, flux processes are also known, in which fluxes are employed to promote the reaction between the individual metal oxides. Thus, $Me^1_2Y$ ferrites may be crystallized out from sodium ferrite melts [A. Tauber et al., J. Appl. Phys., Suppl. 33 (1962), 1381 S] or barium borate melts [A. Tauber, et al., J. Appl. Phys. 35 Part 2 (1964), 1008]. However, the processes have to be carried out at 1200° C. or above.

For various applications in high frequency technology, it is desirable to have an $Me^1_2Y$ powder which may be sintered to give a very dense, magnetically soft ceramic, and has flaky particles which can be readily oriented in a magnetic field. It is also desirable to have a powder which may be readily incorporated into plastic or rubber. Magnetically soft plastoferrites produced in this manner can absorb, for example, radio waves, and are useful as shielding materials. A further useful $Me^1_2Y$ powder is one which may be readily dispersed in a finish to give a magnetically soft paint for shielding purposes.

It was therefore desirable to provide a simple and cheap process for the preparation of a hexagonal $Me^1_2Y$ ferrite powder, in which the product obtained fulfils the above requirements. A magnetically soft, hexagonal ferrite powder of this type must possess a single phase, a narrow particle size distribution, and good dispersibility, for incorporation into organic binders, and must be readily oriented in a magnetic field.

The ferrite powders of the formula (III) which are employed for the production of ferrite permanent magnets and of substantially counterfeit-proof magnetic recordings are also usually prepared by a ceramic process. For this purpose, barium carbonate or strontium carbonate and iron oxide are mixed in the ratio which corresponds to the chemical formula of the ferrite to be produced, and the mixture is heated, ie. pre-sintered, at from 1100° C. to 1300° C. On pre-sintering, the magnetic hexaferrite is formed. The sintered crystallite conglomerates formed are then milled, generally in the presence of water, to give a powder of particle size about 1 $\mu$m. The milling creates crystal defects in the particles, which reduce the coercivity. Ferrite powders produced in this manner generally have very good specific remanence, but the magnetization coercive force $H_c$ is very low, being about 200 kA/m before milling and $\leq$150 kA/m after milling. These crystal defects caused by milling can be only partially eliminated by heating after milling, or by a sintering process. Consequently, the magnets which are produced from milled magnetically hard barium ferrite powder and which are used in industry at the present time, have $H_c$ values of only from 280 to 320 kA/m. Furthermore, the milled ferrite powders exhibit a broad particle size spectrum.

An alternative process is described in, for example, German Laid-Open Application No. DOS 2,832,892. In this, a Ba-Fe(III) nitrate solution is sprayed, in a tower, in counter-current to a heating gas at 1200° C. The process has the disadvantage that the Ba ferrite powder obtained is contaminated with $\alpha$-Fe$_2$O$_3$, thereby reducing the saturation magnetization and residual magnetization compared to one-phase ferrite. Furthermore, the crystallites obtained are partially sintered together, so that before further use the powder must be milled.

In addition to the above process, co-precipitation processes have also been employed for preparing barium ferrites and strontium ferrites. Thus, K. Haneda et al., J. Amer. Ceram. Soc. 57 (8) (1974), 354–7, describe the preparation of highly coercive barium ferrite by heating a filtered-off, washed and dried BaCO$_3$/Fe(OH)$_3$ co-precipitate at 925° C. The co-precipitate is prepared by mixing a Ba-Fe(III) chloride solution and an NaOH/ Na$_2$CO$_3$ solution, using an almost 4-fold excess of alkali. Another co-precipitation process from Ba-Fe(III) chloride solution and excess Na$_2$CO$_3$ solution is disclosed in German Laid-Open Application No. DOS 1,948,914 (U.S. Pat. No. 3,582,266). The co-precipitate of Ba carbonate and Fe(III) carbonate is filtered off, washed, spray-dried, and heated at 1100° C. The excess Na$_2$CO$_3$ serves to permit effective removal of salt constituents after filtration. However, the high temperature required for the heat treatment results in coarse ferrite powders having particle sizes of 0.5–1.0 $\mu$m, and $H_c$ values which are also obtainable by the ceramic process. A further co-precipitation process is disclosed in British Pat. No. 1,254,390 (U.S. Pat. No. 3,634,254). This employs an ammoniacal Ba-Fe(III) nitrate solution, the cations being precipitated with an ammonium salt of a fatty acid. Here again, a heat treatment is required, with its consequent adverse effects on the particle size spectrum.

The above processes have the disadvantage that the co-precipitate produced in a liquid phase is too finely divided and accordingly very difficult to separate from the liquid phase. Since, furthermore, the precipitated finely divided Ba salt in part runs through the filter, it is difficult to obtain precipitated products of a composition corresponding to the specified molar ratio of the particular components. Because of these shortcomings, these processes have hitherto not been operated industrially. They have the further disadvantage that the ferrites obtained are difficult to disperse, because they have sintered during heating, and must be milled before being used further.

In order to overcome the disadvantage of poor filterability, German Published Application No. DAS 2,738,830 (U.S. Pat. No. 4,120,807) proposes producing a coarse Fe$_3$O$_4$ and BaCO$_3$, of particle size 0.5–0.7 $\mu$m, by coprecipitation. The Ba ferrite obtained after heating at from 400° to 900° C. has a crystallite diameter of 0.5–0.9 $\mu$m and is thus relatively coarse and, in part, is obtained in a sintered form.

Co-precipitations in general bring about intimate contact between the reactants and thus accelerate the reaction. However, flux processes are also known, in which fluxes, for example B$_2$O$_3$, alkali metal borates, PbO, alkali metal ferrites, Bi$_2$O$_3$, molybdates, alkali metal halides and alkali metal sulfates, are employed to promote the reaction between the individual metal oxides.

Thus, according to U.S. Pat. No. 3,793,443, barium ferrite is prepared by heating a BaCO$_3$/FeOOH/NaCl/KCl mixture. This publication considers that it is important to start from FeOOH as the iron component, in order to effect the ferrite formation in the presence of H$_2$O produced in situ. Furthermore, complete ferrite formation is observed only at high temperatures, well above the melting point of the added alkali metal chlorides (ie. at about 1000° C.); lower temperatures give low yields of Ba ferrite. The process offers no improvement over the ceramic method in respect of coercive force achieved. Furthermore, the particles have a crystallite diameter of about 1–1.5 $\mu$m, ie. they are relatively coarse. According to German Laid-Open Application No. DOS 2,401,029 (U.S. Pat. No. 3,810,973), a suspension of iron-(III) oxide hydrate in an alkali metal chloride solution is mixed with BaCO$_3$ powder, and the mixture is then spray-dried, and heated at 1000°–1050° C. The process gives a relatively coarse hexagonal ferrite having crystallite diameters of about 1–1.5 $\mu$m. German Laid-Open Application No. 2,143,793 describes a process for the preparation of barium ferrite, in which a BaCO$_3$/Fe$_2$O$_3$/Na$_2$SO$_4$/K$_2$SO$_4$ mixture is heated at 950° C. This process, also, gives a coarse ferrite.

For a number of uses in the field of counterfeitproof coding, for example for identity cards and credit cards, and the magnetic storage of other identifying information, it is desirable to have magnetic recording media which possess higher coercive fields than the standard storage media used at the present time. Appropriate materials would be less sensitive to stray magnetic fields, and hence difficult to counterfeit.

It is an object of the present invention to provide a simple and economical process for the preparation of the said ferrites, in which the products obtained fulfil the requirements made. The ferrites obtainable by this process must possess, in particular, fine particles coupled with a narrow particle size distribution, and good dispersibility, for incorporation into organic binders. Moreover, the magnetically hard ferrites must have a high coercive force which is simple to set at a defined value.

We have found that this object is achieved and that, surprisingly, the finely divided ferrites of the general formula $$MeFe_2O_4 \qquad (I)$$

where $Me = aMn + bNi + cZn + dCo + eFe(II)$, and the atomic weight ratios a, b, c, d and e are each from 0 to 1 and their sum is 1, or $$M_2^1Me^1_2Fe_{12}O_{22} \qquad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \qquad (III)$$

where $M^2$ is barium or strontium, $Me^2$ is zinc, nickel and/or cobalt and x is from 0 to 1.5, may be prepared, the products conforming to the requirements made, if aqueous solutions of the Me, $Me^1$, $Me^2$, $M^1$ and/or $M^2$ salts required for the particular composition corresponding to the formula (I), (II) or (III), with or without the addition of titanium tetrachloride, and an aqueous iron(III) chloride solution, are reacted with an aqueous solution of sodium carbonate and/or potassium carbonate, the resulting mixture is brought to dryness, the dry salt mixture is then heated to 800°–1200° C. and the resulting finely divided ferrite of the predetermined composition is isolated by leaching with water.

The novel process may be used to prepare, in particular, isotropic ferrite powders having the spinel structure, of the general formula (I) $MeFe_2O_4$, where $Me = a$ $Mn + b$ $Ni + c$ $Zn + d$ $Co + e$ $Fe(II)$ and the atomic weight ratios a, b, c, d and e are each from 0 to 1 and their sum is 1, and possessing the required properties, if an aqueous solution or suspension of one or more of the Me salts and an aqueous iron(III) chloride solution are reacted with an aqueous solution of sodium carbonate and/or potassium carbonate, the resulting mixture, consisting of sparingly soluble $MeCO_3$ and iron(III) carbonate, in a solution of sodium chloride and/or potassium chloride, is brought to dryness, the dry salt mixture is then heated at above the melting point of sodium chloride and/or potassium chloride but not above 1200° C., and the resulting ferrite of the composition $MeFe_2O_4$, which has octahedral particles, is isolated by leaching with water.

When working out the novel process, it was found to be advantageous to employ the particular Me salt or salts in the form of the chlorides or carbonates, the atomic weight ratio of iron(III) to the Me cations in the salts employed corresponding to the predetermined formula. Furthermore, it is advantageous if the atomic weight ratio of (Na+K) to Cl in the co-precipitate is from 0.9 to 1.4. After the Me carbonate and iron(III) carbonate precipitate has been produced in the alkali metal chloride solution, the precipitate is brought to dryness, conventionally by spray-drying. The resulting salt mixture is then heated for from 0.5 to 3 hours at above the melting point of the alkali metal chloride but not above 1200° C. This heat treatment may be carried out either in air or in an inert gas atmosphere. After the melt has been cooled, the melt cake is treated with water, the alkali metal chloride being dissolved out and the ferrite powder remaining.

The novel process gives a non-sintered loose ferrite powder which consists of isotropic octahedral crystallites having a good, regular crystal habit and a narrow particle size distribution. The diameter of the octahedral powder particles may be varied from 0.1 to 2.0 μm, depending on the reaction temperature used, and the specific surface area (BET) accordingly varies from 10 to 0.5 m²/g.

The process is technically simpler, in a number of respects, than the conventional co-precipitation processes for obtaining cubic ferrites having the spinel structure. Thus, the lengthy filtration of the coprecipitates is dispensed with, and the predetermined Fe/Me ratio is preserved, since no component is lost through the filter. Moreover, the lengthy washing of the co-precipitates is no longer necessary. The presence of the alkali metal chloride during heating prevents the octahedra of the cubic ferrite from sintering, so that the powder obtained need not be milled before further processing, and the creation of crystal defects and a broad particle size spectrum is thereby avoided. In contrast to the products obtained in the ceramic process or in the co-precipitation process, the spinel powders obtained using the novel process are composed of regular octahedral crystallites with a very pronounced crystal habit. The size of the isotropic particles may be varied within a very wide range, depending on the reaction temperature used, and the particles obtained are of remarkably uniform size.

The above special particle properties ensure that the product has good dispersibility in organic media for the production of magnetically soft paints or plastoferrites, for example for shielding purposes. Furthermore, the powders obtained by the novel process exhibit good compression characteristics when compressed biaxially or isostatically. When these moldings are sintered, and not-pressed biaxially or isostatically, the resulting ceramic is suitable for producing ferrite magnetic heads, and has a uniform particle size spectrum, and improved mechanical and magnetic properties compared with conventional ferrite ceramics.

Using the novel process, the finely divided hexagonal $Me^1_2Y$ ferrite of the general formula $M^1_2Me^1_2Fe_{12}O_{22}$, where $M^1$ is barium, strontium, calcium and/or lead and $Me^1$ is divalent manganese, copper, iron, cobalt, nickel, zinc, magnesium and/or equimolar amounts of lithium and trivalent iron, may likewise be prepared from a melt of sodium and/or potassium salts, if an aqueous solution or suspension of an $M^1$ salt, an aqueous solution or suspension of an $Me^1$ salt and an aqueous solution of an iron(III) salt are reacted with an aqueous sodium carbonate solution, the resulting mixture, consisting of sparingly soluble $M^1$ salt, $Me^1$ salt and iron(III) carbonate, in a sodium salt solution, is brought to dryness, the dry salt mixture is then heated at from 800° C. to 1050° C., and the resulting flaky $Me^1_2Y$ ferrite is then isolated from the $Me^1_2Y$ ferrite/sodium salt mixture by leaching with water.

When the novel process was worked out, it was found to be advantageous to choose the individual components of the reaction mixture so that the ferrite formation takes place in either a sodium chloride melt or a sodium sulfate melt.

If the ferrite formation is effected in the presence of sodium chloride, an aqueous solution of $M^1Cl_2$ or a suspension of $M^1CO_3$ in water, an aqueous solution of $Me^1Cl_2$ or a suspension of $Me^1CO_3$ in water and an aqueous solution of $FeCl_3$ are reacted with an aqueous $Na_2CO_3$ solution, the resulting mixture, consisting of sparingly soluble $M^1$ carbonate, $Me^1$ carbonate and Fe(III) carbonate, in a sodium chloride solution, is brought to dryness, preferably by spray-drying, the dry NaCl-containing salt mixture is then heated for from 0.5 to 3 hours at from 800° to 1050° C., and the resulting flaky $Me^1_2Y$ ferrite is then isolated from the $Me^1_2Y$ ferrite/NaCl mixture by leaching with water. In this process, it has proven advantageous to employ the following molar ratios in the co-precipitation: $Fe/M^1 = 5-6$, $Fe/Me^1 = 5-6$ and $Na/Cl = 0.9-1.4$.

The preparation of $Me^1_2Y$ ferrite in the presence of $Na_2SO_4$ differs in that a suspension of $M^1SO_4$ or $M^1CO_3$ in water, an aqueous solution of $Me^1SO_4$ or a suspension of $Me^1CO_3$ in water and an aqueous solution of $Fe_2(SO_4)_3$ are reacted with an aqueous $Na_2CO_3$ solution, the resulting mixture, consisting of sparingly soluble $M^1$ salts, $Me^1$ salts and Fe(III) salts, in a sodium sulfate solution, is brought to dryness, preferably by spray-drying, the dry $Na_2SO_4$-containing salt mixture is then heated for from 0.5 to 3 hours at from 800° to 1050° C., and the resulting flaky $Me^1_2Y$ ferrite is then isolated from the $Me^1_2Y$ ferrite/$Na_2SO_4$ mixture by leaching with water. It has proven advantageous to employ the following molar ratios in the co-precipitation: $Fe/M = 5-6$, $Fe/Me = 5-6$ and $Na/SO_4 = 1.8-2.8$.

Using the novel process, $Me^1_2Y$ ferrites may be obtained directly as finely divided non-sintered powders which do not need to be milled for further processing. They consist of hexagonal flakes having a diameter of about 1–3 μm. The flakes obtained at about 900° C. have a diameter/thickness ratio of about 30, and are extremely thin. As the temperature increases, the flake thickness increases substantially, so that the above ratio is about 10 when the product is obtained at 1050° C. The values of the specific surface area (BET) are from 1 to 10 m²/g. The $Zn_2Y$ ferrite powder of composition $Ba_2Zn_2Fe_{12}O_{22}$ obtained at 950° C. is a single phase as determined by X-ray defraction (Guinier technique), and has an $H_c$ value of less than 2 kA/m. When the product is obtained at a higher temperature, the $H_c$ value is less than 1 kA/m, and the saturation magnetization is 35 nTm³/g. The measurements were carried out in a magnetic field of 160 kA/m.

The free-flowing non-sintered flaky ferrite powders obtained using the novel process possess particularly good dispersibility, and are therefore particularly suitable for producing magnetic paints and plastoferrites. When the magnetic powders are subjected to biaxial or uniaxial dry or wet compression to produce magnetically soft ceramics for high frequency applications, the $Me^1_2Y$ particles, owing to their extremely flaky habit, are, as desired, oriented to a large extent so that the flakes are perpendicular to the direction of compression, this being the base in particular in the presence of a magnetic field.

Using the novel process, the hexagonal ferrites of the general formula (III) $M^2(Me^2Ti)_xFe_{12-2x}O_{19}$, where $M^2$ is barium or strontium, $Me^2$ is zinc, nickel and/or cobalt and x is from 0 to 1.5, may be equally advantageously prepared, the products having the required properties, if an aqueous barium chloride or strontium chloride solution and an aqueous iron(III) chloride solution, with or without an aqueous $Me^2$ chloride solution, and with or without the addition of titanium tetrachloride, are reacted with an aqueous sodium carbonate solution, the resulting mixture, consisting of sparingly soluble precipitates in a sodium chloride solution, is brought to dryness, the dry salt mixture is then heated at above the melting point of the sodium chloride but not above 950° C., and the resulting finely divided flaky hexagonal ferrite of the above composition is then isolated by leaching with water.

To carry out the novel process, an aqueous iron(III) chloride solution together with an aqueous solution of the $M^2Cl_2$ and, where relevant, the $Me^2Cl_2$, are introduced into a stirred aqueous sodium carbonate solution which advantageously contains the number of equivalents of sodium ions which corresponds to the sum of the chloride ions added to the reaction mixture during the process. Thereafter, an equimolar amount, based on the $Me^2Cl_2$ employed, of liquid $TiCl_4$ may, if required, by introduced into the reaction mixture by uniform dropwise addition, stirring being continued. For this procedure, a suitable apparatus must be used to ensure that some of the $TiCl_4$ does not volatilize. Thereafter, 10% strength sodium carbonate solution is added to the coprecipitate obtained until the slurry has a pH of from 5.0 to 6.5. This slurry is then brought to dryness, usually by spray-drying. The salt mixture obtained therefrom is then heated for from 0.5 to 3 hours at above the melting point of the sodium chloride present in the salt mixture but not at above 950° C. After cooling, the resulting melt cake is treated with water so that the sodium chloride is dissolved out. A finely divided brown or black material remains, which is filtered off and washed with water. This material is a hexagonal ferrite of the above general formula.

By means of the novel process, these ferrites may be obtained directly as finely divided, non-sintered powders. They consist of very small flakes with a regular hexagonal crystal habit, and have a very narrow particle size distribution, a flake diameter of from 0.05 to 0.2 μm and a specific surface area of the particles of from 8 to 15 m²/g. With regard to their magnetic properties, the ferrites prepared according to the invention have coercive forces ($H_c$) as high as 530 kA/m and specific remanences as high as 41 nTm³/g, depending on the particular composition. The narrow field strength distribution of the hexagonal ferrites obtainable in accordance with the invention is particularly advantageous. The $h_{25}$ value used to characterize the field strength distribution is deduced from the d.c. demagnetization curve (remanence curve) of a powder or of a magnetic tape. After magnetic saturation of the sample, the magnetic field strengths, in the opposite direction, which, after applying and switching off the field, have switched 25, 50 and 75% of the magnetic particles are determined. If these field strengths are respectively described as $H_{25}$, $H_{50}$ and $H_{75}$, then $$h_{25} = (H_{75} - H_{25})/H_{50}.$$

A narrow field strength distribution manifests itself in a low $h_{25}$ value. This is 0.15 for the ferrites prepared according to the invention and having a maximum $H_c$ value, and is thus extremely low compared with the prior art. As the doping x increases, the coercive force and, in some cases, even the remanence decrease, the field strength distribution ($h_{25}$) increasing at the same time.

It is remarkable that the $h_{25}$ values of the doped hexagonal ferrites prepared by the novel process are nevertheless advantageously substantially lower, at the same $H_c$ value, than those of ferrite powders prepared by other processes.

The above magnetic properties were determined in each case after pulsed magnetic biassing ($H_{max}=7000$ kA/m) in a field of 800 kA/m.

Further, the process according to the invention is technically simpler, in a number of respects, than the conventional co-precipitation processes or flux processes. Thus, the lengthy filtration and washing of the co-precipitates is dispensed with, and the predetermined ratio of metal ions is preserved, since no component is lost through the filter. In contrast to the above conventional processes, the co-precipitate in the novel process is brought to an acidic pH of 5.0-6.5 and processed further as such, thereby saving alkali.

A further advantage of the process according to the invention is that the heating is carried out at from 800° to 950° C. Heating the sodium chloride/ferrite mixtures at these temperatures is advantageous because the volatility of the sodium chloride present is still comparatively low, and the waste gas is hence only slightly contaminated. Moreover, the possibility that the sodium chloride may attack the reaction vessel at above 1000° C. must be taken into account.

The presence of the sodium chloride during heating prevents the hexagonal ferrite flakes from sintering, so that the powder obtained need not be milled before further processing, this milling creating crystal defects and having an adverse effect on the coercive force and field strength distribution.

The above special particle properties result in good magnetic properties and also in improved dispersibility. Because of this dispersibility, the ferrites prepared according to the invention are particularly useful as magnetic material for the production of magnetic recording media. In this application, the ferrite powder exhibits better magnetic properties than those of conventional products. Furthermore, the ferrite powders prepared according to the invention are so finely divided that the magnetic layers prepared therewith have excellent surface quality even when they are very thin. On conversion to magnetic recording media, the high coercive force of the magnetic powders is preserved, so that very highly coercive magnetic recording media with $H_c$ values as high as 530 kA/m can be prepared. Because of this high $H_c$, it is difficult to change a magnetic recording, once it has been made. This makes the magnetic recordings substantially insensitive to stray fields, and stable, and even, to a certain extent, counterfeit-proof.

The Examples which follow illustrate the invention.

EXAMPLE 1

A solution consisting of 272.6 g of $ZnCl_2$, 554.2 g of $MnCl_2.4H_2O$ and 2,811.1 g of $FeCl_3.6H_2O$ in 20 l of $H_2O$ is prepared and introduced into a stirred solution of 2,162.2 g of $Na_2CO_3$ in 8 l of $H_2O$. The suspension obtained is then spray-dried. Thereafter, a part of the spray-dried powder is heated for one hour in air in a box furnace which has been preheated to 1060° C. After cooling, the resulting manganese zinc ferrite/NaCl mixture is introduced into cold water, while stirring, and the NaCl constituent of the mixture dissolves. The resulting ferrite powder is filtered off, washed and dried. The manganese zinc ferrite product, which in an X-ray diagram shows only one phase, consists of octahedral crystallites having a particle diameter of 0.6 μm. The magnetic properties are as follows: $H_c=0.7$ kA/m, $M_r/\rho=2.8$ nTm$^3$/g, $M_s/\rho=63$ nTm$^3$/g. The magnetic measurements were carried out in a magnetic field of $H_m=160$ kA/m.

EXAMPLE 2

A further part of the spray-dried powder from Example 1 is heated for one hour under argon in a box furnace which has been preheated to 1050° C. After cooling, the ferrite/salt mixture obtained is worked up as described in Example 1. The resulting MnZn ferrite product, which in an X-ray diagram shows only one phase, has a particle size of 0.3 μm. The magnetic properties are as follows: $H_c=1.2$ kA/m, $M_r/\Sigma=4.7$ nTm$^3$/g, $M_s/\rho=64$ nTm$^3$/g. The magnetic measurements were carried out in a magnetic field of $H_m=160$ kA/m.

EXAMPLE 3

A solution consisting of 1,050.4 g of $BaCl_2.2H_2O$, 586.0 g of $ZnCl_2$ and 6,487.2 g of $FeCl_3.6H_2O$ in 45 l of $H_2O$ is prepared and introduced into a stirred solution of 4,727.2 g of $Na_2CO_3$ in 15 l of $H_2O$. The suspension obtained is then spray-dried. Thereafter, a part of the spray-dried powder is heated for one hour in air in a box furnace which has been preheated to 950° C. After cooling, the $Ba_2Zn_2Fe_{12}O_{22}$/NaCl mixture obtained is introduced into cold water, while stirring, and the NaCl constituent of the mixture dissolves. The ferrite is then filtered off, washed and dried. The $Ba_2Zn_2Fe_{12}O_{22}$ product, which in an X-ray diagram shows only one phase, consists of very thin crystal flakes having a diameter of from 1 to 3 μm. The magnetic properties (measured in a magnetic field of 160 kA/m) are as follows: $H_c=1.7$ kA/m, $M_s/\rho=34$ nTm$^3$/g, $M_r/\rho=8$ nTm$^3$/g.

EXAMPLE 4

A part of the spray-dried powder from Example 3 is heated for one hour in air in a box furnace which has been preheated to 1050° C. The $Zn_2Y$/NaCl mixture obtained is processed further as described in Example 3. A $Ba_2Zn_2Fe_{12}O_{22}$ product which exhibits one phase and has crystal flakes of from 1 to 3 μm is obtained. The magnetic properties (measured in a magnetic field of 160 kA/m) are as follows: $H_c=0.7$ kA/m, $M_s/\rho=35$ nTm$^3$/g, $M_r/\rho=2$ nTm$^3$/g.

EXAMPLE 5

A solution consisting of 139.6 g of $BaCl_2.2H_2O$ and 1,776.4 g of $FeCl_3.6H_2O$ in 8 l of $H_2O$ is prepared and introduced into a stirred solution of 1,105.5 g of $Na_2CO_3$ in 11 l of water. The pH of the mixture is 5.5. The suspension obtained is then spray-dried. Thereafter, the spray-dried powder is heated for one hour in air in a box furnace which has been preheated to 850° C. After cooling, the resulting $BaFe_{12}O_{19}$/NaCl mixture is introduced into cold water, while stirring, and the NaCl constituent of the mixture dissolves. The brown ferrite is then filtered off, washed and dried. The $BaFe_{12}O_{19}$ product, which in an X-ray diagram shows only one phase, consists of crystal flakes having a narrow particle size spectrum, a flake diameter of from 0.1 to 0.2 μm and a specific surface area of 11.6 m$^2$/g. The magnetic properties (measured in a magnetic field of 800 kA/m) are as follows: $H_c=450$ kA/m, $M_r/\rho=41$ nTm$^3$/g. The field strength distribution $h_{25}$ is 0.18.

COMPARATIVE EXAMPLE 1

A solution consisting of 139.6 g of BaCl$_2$.2H$_2$O and 1,776.4 g of FeCl$_3$.6H$_2$O in 8 liters of water is prepared and introduced into a stirred solution of 1,105.5 g of Na$_2$CO$_3$ in 11 liters of water. The pH of the mixture is 5.5. The suspension obtained is then spray-dried. Thereafter, the spray-dried powder is heated for one hour in air in a box furnace which has been preheated to 750° C. The BaFe$_{12}$O$_{19}$/NaCl mixture obtained after cooling is introduced into cold water, while stirring, and the NaCl constituent of the mixture dissolves. The brown ferrite is then filtered off, washed and dried. The BaFe$_{12}$O$_{19}$ product, which in an X-ray diagram shows only one phase, consists of crystal flakes having a narrow particle size spectrum, a flake diameter of from 0.1 to 0.2 μm and a specific surface area of 12 m$^2$/g. The magnetic properties are as follows: $H_c=417$ kA/m, $M_r/\rho=38$ nTm$^3$/g. The $h_{25}$ value is 0.21.

EXAMPLE 6

A solution consisting of 266.6 g of SrCl$_2$.6H$_2$O and 3,189.5 g of FeCl$_3$.6H$_2$O in 18 l of H$_2$O is prepared and introduced into a stirred solution of 1,982.0 g of Na$_2$CO$_3$ in 7 l of water. The pH of the mixture is 5.8. The suspension obtained is then spray-dried. Thereafter, the spray-dried powder is heated for one hour in air in a box furnace which has been preheated to 850° C. After cooling, the resulting SrFe$_{12}$O$_{18}$/NaCl mixture is introduced into cold water, while stirring, and the NaCl constituent of the mixture dissolves. The brown ferrite is then filtered off, washed and dried. The SrFe$_{12}$O$_{19}$ product, which in an X-ray diagram shows only one phase, consists of crystal flakes having a narrow particle size spectrum, a flake diameter of from 0.1 to 0.2 μm and a specific surface area of 13.2 m$^2$/g. The magnetic properties (measured in a magnetic field of 800 kA/m) are as follows: $H_c=532$ kA/m, $H_R=605$ kA/m, $M_r/\rho=41$ nTm$^3$/g. The field strength distribution $h_{25}$ is 0.16.

EXAMPLE 7

A solution consisting of 1037.5 g of BaCl$_2$.2H$_2$O, 260.5 g of ZnCl$_2$ 12,627.6 g of FeCl$_3$.6H$_2$O in 20 l of water is prepared and introduced into a stirred solution of 8,521.2 g of Na$_2$CO$_3$ in 20 l of H$_2$O. 394.8 g of TiCl$_4$ are introduced dropwise while stirring is continued. The pH of the suspension obtained is 5.6, and this is then brought to 6.0 by the addition of 10% strength Na$_2$CO$_3$ solution, about 1.6 l being required for this purpose. The suspension obtained is then spray-dried. Thereafter, the spray-dried powder is heated for one hour in air in a box furnace which has been preheated to 850° C. After cooling, the resulting ferrite/NaCl mixture is introduced into cold water, while stirring, and the NaCl constituent of the mixture dissolves. The brown ferrite is then filered off, washed and dried. The product, which in an X-ray diagram shows one phase, consists of crystal flakes having a narrow particle size spectrum, a flake diameter of 0.05-0.1 μm and a specific surface area of 15.6 m$^2$/g. The magnetic properties(measured in a magnetic field of 800 kA/m) are as follows: $H_c=245$ kA/m, $H_R=280$ kA/m, $M_r/\rho=39$ nTm$^3$/g. The field strength distribution $h_{25}$ is 0.39.

EXAMPLE 8

A solution consisting of 244.3 g of BaCl$_2$.2H$_2$O, 136.3 g of ZnCl$_2$ and 2,703.0 g of FeCl$_3$.6H$_2$O in 5 l of water is prepared and introduced into a stirred solution of 2,013.8 g of Na$_2$CO$_3$ in 7 l of H$_2$O. 190.6 g of TiCl$_4$ are then added dropwise while stirring is continued. The pH of the suspension obtained is 5.1, and is then brought to 5.8 by the addition of 10% strength Na$_2$CO$_3$ solution. The suspension obtained is then spray-dried. Thereafter, the spray-dried powder is heated for one hour in air in a box furnace which has been preheated to 890° C. After cooling, the resulting ferrite/NaCl mixture is introduced into cold water, while stirring, and the NaCl constituent dissolves. The brown ferrite is then filtered off, washed and dried. The product, which in an X-ray diagram shows one phase, consists of crystal flakes having a narrow particle size spectrum, a flake diameter of 0.05-0.1 μm and a specific surface area of 12.1 m$^3$/g. The magnetic properties (measured in a magnetic field of 800 kA/m) are as follows: $H_c=143$ kA/m, $H_R=183$ kA/m, $M_r/\rho=33$ nTm$^3$/g. The field strength distribution $h_{25}$ is 0.41.

EXAMPLE 9

A solution consisting of 244.3 g of BaCl$_2$.2H$_2$O, 204.4 g of ZnCl$_2$ and 2,432.7 g of FeCl$_3$.6H$_2$O in 5 l of water is prepared and introduced into a stirred solution of 2,013.9 g of Na$_2$CO$_3$ in 7 l of H$_2$O. 285.9 g of TiCl$_4$ are then added dropwise while stirring is continued. The pH of the suspension obtained is 5.6. The suspension is then spray-dried. Thereafter, the spray-dried powder is heated for one hour in air in a box furnace which has been preheated to 900° C. After cooling, the resulting ferrite/NaCl mixture is introduced into cold water, while stirring, and the NaCl constituent of the mixture dissolves. The brown ferrite is then filtered off, washed and dried. The product, which in an X-ray diagram shows one phase, consists of crystal flakes having a narrow particle size spectrum, a flake diameter of 0.05-0.15 μm and a specific surface area of 10.1 m$^2$/g. The magnetic properties (measured in a magnetic field of 800 kA/m) are as follows: $H_c=86$ kA/m, $H_R=105$ kA/m, $M_r/\rho=21$ nTm$^3$/g. The field strength distribution $h_{25}$ is 0.44.

EXAMPLE 10

A solution consisting of 760.3 g of BaCl$_2$.2H$_2$O, 538.6 g of CoCl$_2$.6H$_2$O and 7,954.3 g of FeCl$_3$.6H$_2$O in 14 l of water is prepared and introduced into a stirred solution of 5,728.3 g of Na$_2$CO$_3$ in 13 l of H$_2$O. 431.6 g of TiCl$_4$ are then added dropwise while stirring is continued. The pH of the suspension is 5.0, and this is then brought to 6.0 by the addition of 10% strength Na$_2$CO$_3$ solution, about 2.0 l being required for this purpose. The suspension obtained is then spray-dried. Thereafter, the spray-dried powder is heated for one hour in air in a box furnace which has been preheated to 900° C. After cooling, the resulting ferrite/NaCl mixture is introduced into cold water, while stirring, and the NaCl constituent of the mixture dissolves. The ferrite obtained is then filtered off, washed and dried. The product, which in an X-ray diagram shows one phase, consists of crystal flakes having a narrow particle size spectrum, a flake diameter of 0.05-0.15 μm and a specific surface area of 12.2 m$^2$/g. The magnetic properties (measured in a magnetic field of 800 kA/m) are as follows: $H_c=66$ kA/m, $H_R=87$ kA/m, $M_r/\rho=33$ nTm$^3$/g. The field strength distribution $h_{25}$ is 0.66.

EXAMPLE 11

A solution consisting of 244.3 g of BaCl$_2$.2H$_2$O, 237.9 g of CoCl$_2$.6H$_2$O and 2,703.0 of FeCl$_3$.6H$_2$O in 5 l of water is prepared and introduced into a stirred solution of 2,013.8 g of Na$_2$CO$_3$ in 7 l of H$_2$O. 190.6 g of TiCl$_4$ are then added dropwise while stirring is continued. The pH of the suspension obtained is 5.8. The suspension is then spray-dried. Thereafter, the spray-dried powder is heated for one hour in air in a box furance which has been preheated to 900° C. After cooling, the resulting ferrite/NaCl mixture is introduced into cold water, while stirring, and the NaCl constituent of the mixture dissolves. The ferrite obtained is then filtered off, washed and dried. The product, which in an X-ray diagram shows one phase, consists of crystal flakes having a narrow particle size spectrum, a flake diameter of 0.05–0.15 μm and a specific surface area of 11.0 m$^2$/g. The magnetic properties (measured in a magnetic field of 800 kA/m) are as follows: $H_c=32.8$ kA/m, $H_R=47$ kA/m, $M_r/\rho=29$ nTm$^3$/g. The field strength distribution $h_{25}$ is 0.71.

EXAMPLE 13

400 parts of a barium ferrite powder prepared as described in Example 5, with $H_c=450$ kA/m, 100 parts of a 20% strength solution of a copolymer of 80 parts of vinyl chloride, 10 parts of dimethyl maleate and 10 parts of diethyl maleate in a mixture of equal parts of tetrahydrofuran and dioxane, 103 parts of a 13% strength solution of a thermoplastic polyester-urethane obtained from adipic acid, butane-1,4-diol and 4,4'-diisocyanatodiphenylmethane, in a mixture of equal parts of tetrahydrofuran and dioxane, 24 parts of a commercial anionic wetting agent based on phosphoric acid esters and 231 parts of the above solvent mixture are mixed, and dispersed for 6 hours in a vibratory ball mill, using steel balls of 2 mm diameter. 199 parts of the above 13% strength solution of the thermoplastic polyester-urethane, 35 parts of the above solvent mixture, 0.3 part of stearic acid, 0.3 part of a commercial silicone oil and 0.6 part of hydroquinone are added, and dispersion is continued for 2 hours. The dispersion obtained is then filtered, and applied in a conventional manner to a 6 μm thick polyethylene terephthalate film, in an amount such that after orienting the flaky particles by passage under a magnetic field, and then drying and calendering the coating, a 5.4 μm thick magnetic layer is obtained.

The magnetic tape has the following properties: $H_c=465$ kA/m, $M_r=128$ mT, $M_s=194$ mT, orientation ratio=1.2, $h_{25}=0.16$.

EXAMPLE 13

The doped barium ferrite powder prepared in Example 7, with $H_c=245$ kA/m, is processed, as described in Example 12, to give a magnetic tape.

The magnetic tape has the following properties: $H_c=255$ kA/m, $H_R=278$ kA/m, $M_r=121$ mT, $M_s=189$ mT, orientation ratio=1.3, $h_{25}=0.28$, layer thickness=5.6 μm.

EXAMPLE 14

The doped barium ferrite powder prepared in Example 8, with $H_c=143$ kA/m, is processed as described in Example 12, to give a magnetic tape, 470 parts of ferrite being employed, however, instead of 400 parts.

The magnetic tape has the following properties: $H_c=150$ kA/m, $H_R=160$ kA/m, $M_r=116$ mT, $M_s=181$ mT, orientation ratio=1.4, $h_{25}=0.26$, layer thickness=5.2 μm.

EXAMPLE 15

The doped barium ferrite powder prepared in Example 11, with $H_c=32.8$ kA/m, is processed, as described in Example 12, to give a magnetic tape, 470 parts of ferrite being employed, however, instead of 400 parts.

The magnetic tape has the following properties: $H_c=48.7$ kA/m, $H_R=55$ kA/m, $M_r=106$ mT, $M_s=177$ mT, orientation ratio=1.4, $h_{25}=0.35$, layer thickness=4.8 μm.

We claim:

1. A process for the preparation of a finely divided ferrite of the formula $$MeFe_2O_4 \qquad (I)$$

where Me=aMn+bNi+cZn+dCo+eFe(II), and the atomic weight ratios a, b, c, d and e are each from 0 to 1 and their sum is 1, or $$M^1{}_2Me^1{}_2Fe_{12}O_{22} \qquad (II)$$

where $M^1$ is barium, strontium, calcium and/or lead, and $Me^1$ is divalent manganese, copper, iron, cobalt, nickel, zinc, magnesium and/or equimolar amounts of lithium and trivalent iron, or $$M^2(Me^2Ti)_xFe_{12-2x}O_{19} \qquad (III)$$

where $M^2$ is barium or strontium, $Me^2$ is zinc, nickel and/or cobalt and x is from 0 to 1.5, wherein aqueous solutions of the Me, Me$^1$, Me$^2$, M$^1$ and/or M$^2$ salts required for the particular composition corresponding to the formula (I), (II) or (III), with or without the addition of titanium tetrachloride, and an aqueous iron(III) chloride solution, are reacted with an aqueous solution of sodium carbonate and/or potassium carbonate, the resulting mixture is dried without intervening filtering and washing steps, the dry salt mixture is then heated at from 800° to 1200° C. and the resulting finely divided ferrite of the predetermined composition is isolated by leaching with water.

2. A process for the preparation of an isotropic ferrite powder having the spinel structure, of the formula MeFe$_2$O$_4$ (I), where Me=a Mn+b Ni+c Zn+dCo +e Fe (II), and the atomic weight ratios a, b, c, d and e are each from 0 to 1 and their sum is 1, wherein an aqueous solution or suspension of one or more of the Me salts and an aqueous iron(III) chloride solution are reacted with an aqueous solution of sodium carbonate and/or potassium carbonate, the resulting mixture, consisting of sparingly soluble MeCO$_3$ and iron(III) carbonate in a solution of sodium chloride and/or potassium chloride, is dried without intervening filtering and washing steps, the dry salt mixture is then heated at above the melting point of sodium chloride and/or potassium chloride but not above 1200° C., and the resulting ferrite of the composition MeFe$_2$O$_4$, which has octahedral particles, is isolated by leaching with water.

3. A process for the preparation of a hexagonal Me$_2$Y ferrite of the formula M$^1{}_2$Me$^2{}_2$Fe$_{12}$O$_{22}$ (II), where M$^1$ is barium, strontium, calcium and/or lead and Me$^1$ is divalent manganese, copper, iron, cobalt, nickel, zinc, magesium and/or equimolar amounts of lithium and trivalent iron, wherein an aqueous solution or suspension of an $M^1$ salt, an aqueous solution or suspension of an $Me^1$ salt and aqueous solution of an iron(III) salt are reacted with an aqueous sodium carbonate solution, the resulting mixture, consisting of sparingly solution $M^1$ salt, $Me^1$ salt and iron(III) carbonate in a sodium salt solution, is dried without intervening filtering and washing steps, the dry salt mixture is then heated at from 800° to 1050° C., and the resulting flaky $Me^1_2Y$ ferrite is then isolated from the $Me^1_2Y$ ferrite/sodium salt mixture by leaching with water.

4. A process for the preparation of a finely divided hexagonal ferrite of the formula $M^2(Me^2Ti)_xFe_{12-2x}O_{19}$(III), where $M^2$ is barium or strontium, $Me^2$ is zinc, nickel, and/or cobalt and x is from 0 to 1.5, wherein an aqueous barium chloride or strontium chloride solution and an aqueous iron(III) chloride solution, with or without the addition of titanium tetrachloride, are reacted with an aqueous sodium carbonate solution, the resulting mixture, consisting of sparingly soluble precipitates in a sodium chloride solution, is dried without intervening filtering and washing steps, the dry salt mxiture is then heated to above the melting point of the sodium chloride but not above 950° C., and the resulting finely divided flaky hexagonal ferrite of the above composition is then isolated by leaching with water.

* * * * *